Oct. 1, 1963     R. L. MILK     3,105,252
SLIDABLE AND ROTATABLE BEARING SUPPORT
Filed Aug. 24, 1960     3 Sheets-Sheet 1
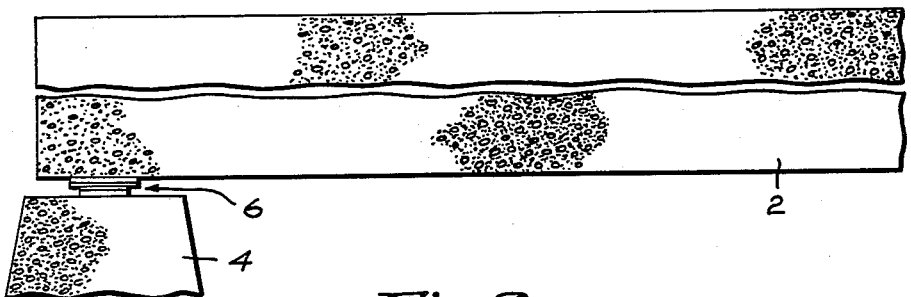
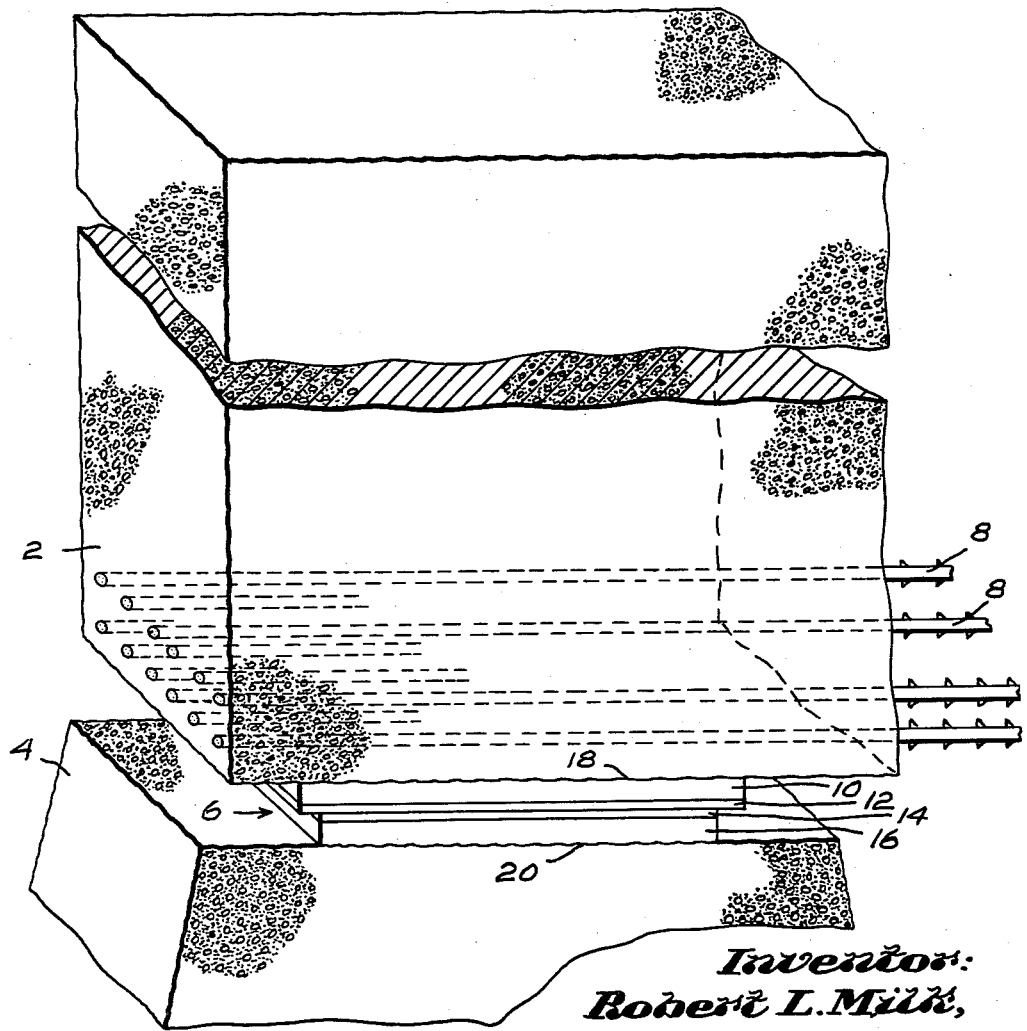
Inventor:
Robert L. Milk,
By Porter, Chittick & Russell
Attorney Oct. 1, 1963  R. L. MILK  3,105,252
SLIDABLE AND ROTATABLE BEARING SUPPORT
Filed Aug. 24, 1960  3 Sheets-Sheet 2
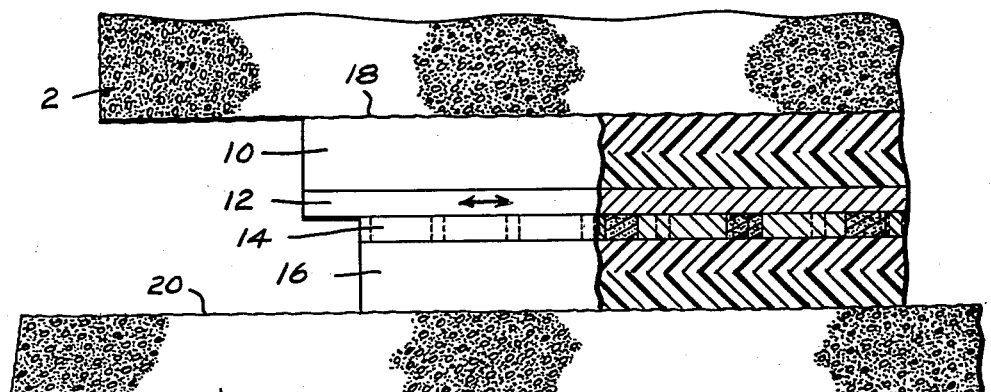
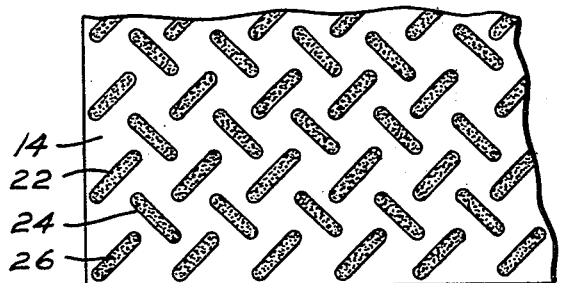
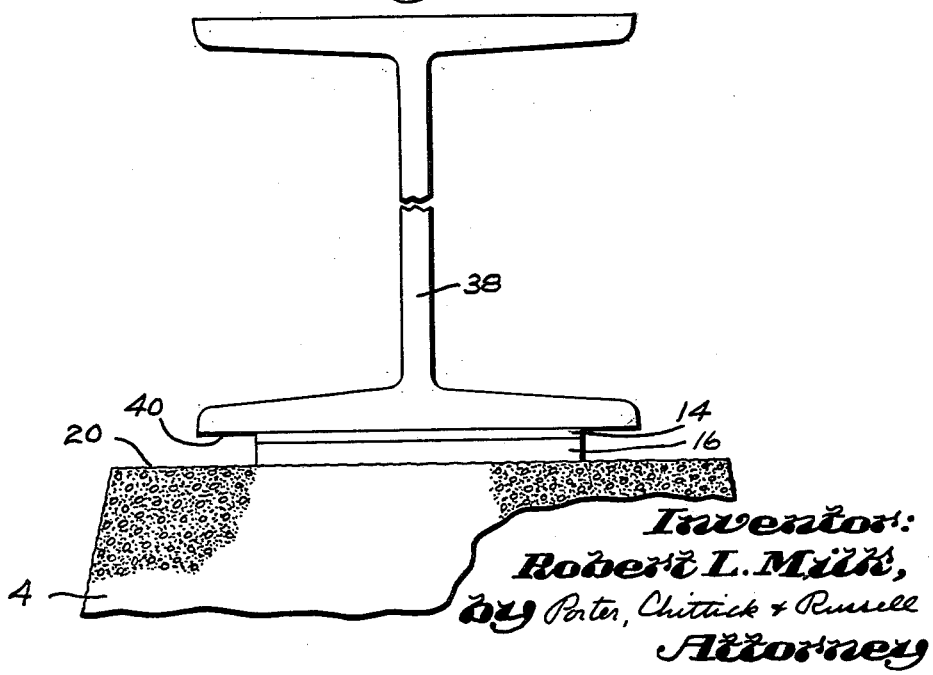
Inventor:
Robert L. Milk,
by Porter, Chittick + Russell
Attorney

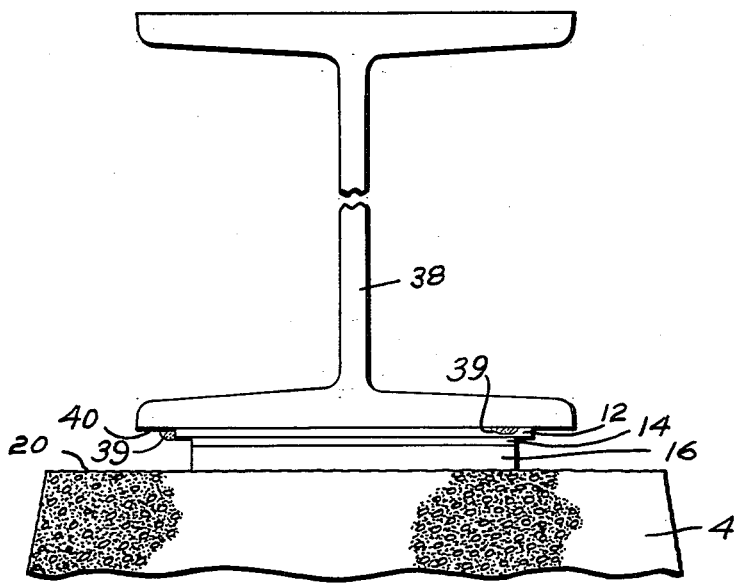
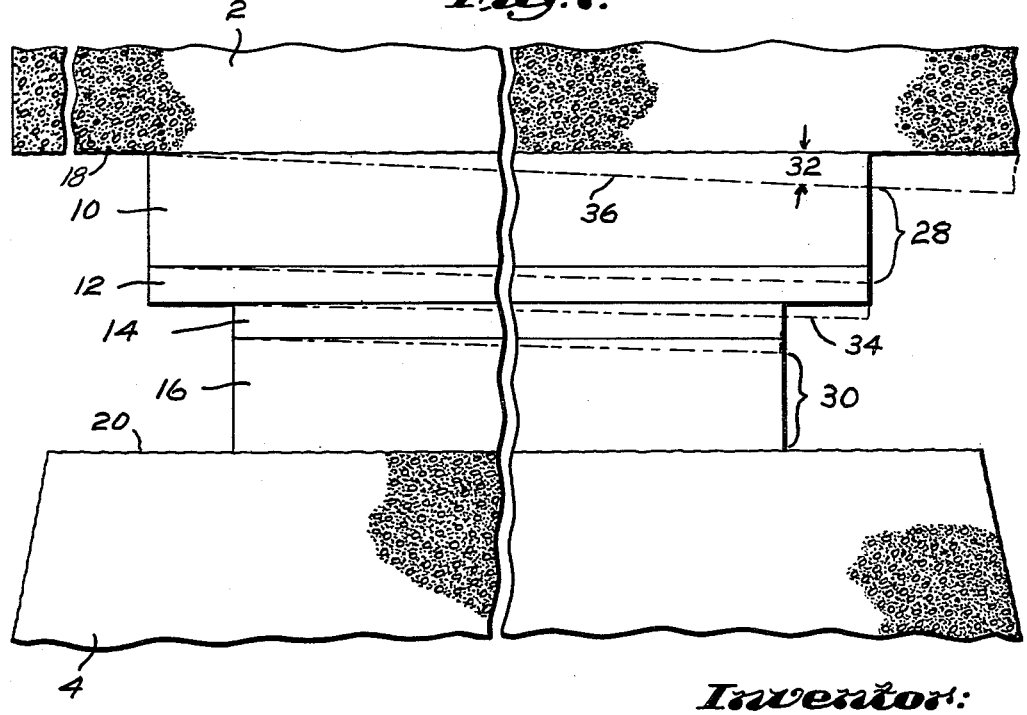

United States Patent Office 3,105,252
Patented Oct. 1, 1963

3,105,252
SLIDABLE AND ROTATABLE BEARING SUPPORT
Robert L. Milk, Westwood, Mass., assignor to Merriman Bros., Inc., Boston, Mass., a corporation of Massachusetts
Filed Aug. 24, 1960, Ser. No. 51,661
1 Claim. (Cl. 14—16)

This invention relates to means for supporting the ends of long structural members such as are used in bridges.

In bridge construction, the supporting beams, which are usually of steel or reinforced concrete, are supported at their ends on suitable piers, abutments, columns or other elements capable of carrying the loads applied. Since the beams are relatively long, provision must be made for longitudinal movement of one end of the beam (assuming the other end to be fixed) with respect to its support as changing temperature causes a corresponding change in the length of the beam. Likewise it is customary to provide means at both ends whereby the end of the beam may turn slightly in a vertical plane as a load is applied to the center of the beam. The angular rotation of the end of the beam under maximum loads applied is quite small, perhaps in the order of 8 to 10 minutes of arc, but nevertheless it is sufficient so that provision must be made for continued proper support of the under side of the beam as such changed angularity occurs.

Heretofore various expedients have been used and numerous constructions have become well known in the bridge field. One such construction is shown in my United States Patent No. 2,680,259. This construction has proven very satisfactory, but there are some situations in which it cannot conveniently or economically be used. One such situation is where a reinforced concrete beam is to be supported on the upper end of a concrete pier to which the conventional bearing plates cannot be readily attached. That is to say, in such cases the devices of the prior art cannot merely be positioned between the pier and beam but must be actually fastened in place.

Accordingly, one of the objects of the present invention is to provide a bearing support which does not have to be fastened in place but which may be merely placed between the top of a rough finished concrete pier and the under side of the end of a reinforced concrete beam. The support is so constructed that the elements thereof that engage the respective surfaces of the pier and the beam will automatically adjust themselves to the surfaces of the concrete. It will be understood, of course, that the present invention can be used to support a steel beam as well as a concrete beam, and in such case one or two of the elements may be omitted since the steel beam takes the place of the omitted element or elements.

Another object of the invention is to provide a supporting device in which one or more of the supporting elements is compressible and deformable to a small degree whereby the said elements, which, in the ordinary case, will be in the form of a pair of compressible pads, preferably relatively thin in relation to their width and length, may make automatic interlocking connection with the upper surface of the pier or other support and the under surface of the beam. This eliminates the necessity of bolting or otherwise securing the pads to the pier and beam.

The invention further contemplates the use of a pair of metallic plates (one of which may be of the self-lubricating type) between the slightly compressible pads, which plates will slide laterally with respect to each other and which will turn slightly in a vertical plane as the beam is deflected and the pads are correspondingly compressed or deformed under the load.

For the foregoing reasons, the invention is believed to be a major advance over the constructions of the prior art.

These and other objects of the invention will become more apparent as the description proceeds with the aid of the accompanying drawings in which:

FIG. 1 is a fragmentary side elevation of a pier and the end of a reinforced concrete beam supported thereon by a bearing support made according to the present invention.

FIG. 2 is an enlarged isometric view of the lefthand end of FIG. 1 showing the parts in more detail.

FIG. 3 is an enlarged fragmentary view of the lefthand end of FIG. 1 showing further details of the construction.

FIG. 4 is a plan view of the self-lubricated plate showing the lubricant positioned in the lubricant receiving formations.

FIG. 5 is an end view of a modified form of the invention in which the concrete pier is shown supporting a steel beam with the upper pad and plate eliminated.

FIG. 6 is a view similar to FIG. 5 different therefrom in that an upper plate has been introduced between the lower side of the beam and the lower plate.

FIG. 7 is an enlarged fragmentary side view of the lefthand end of FIG. 1 showing in exaggerated manner the way the pads are deformed and compressed when the beam is deflected without materially changing the distribution of the pressure on the pads and pier.

Referring first to FIG. 1, there is shown the lefthand end of a reinforced concrete beam 2 which is supported on the upper end of a concrete pier 4 through the use of the bearing support 6 which constitutes the present invention. This bearing support 6 includes (1) means which permits the lefthand end of beam 2 to move horizontally with respect to pier 4 as the length of beam 2 changes with the temperature and (2) means which functions when the beam is deflected through the application of a load at points between its end supports to permit slight turning of the end of the beam without materially changing or affecting the distribution of the load on the beam, the bearing support or the pier. The nature of this behavior is shown in FIG. 7 and will be explained in detail hereinafter.

Referring now to FIGS. 2 and 3, the beam 2, which ordinarily will be of reinforced concrete having in its lower portion a plurality of tension members 8, is supported by the bearing support 6, which comprises an upper pad 10, an upper plate 12, a lower plate 14 and a lower pad 16.

Pads 10 and 16 are made of a material deformable slightly in relation to the load. The material may be of uniform or varying hardness throughout its vertical thickness. The material of which the pads are made is sufficiently flexible or deformable under the load applied thereto by the beam 2 to deform on its surface to match the irregularities of the under surface of beam 2 and the upper surface of pier 4. The irregularities in these two surfaces are indicated by the wavy lines 18 and 20 shown in FIGS. 2 and 3.

The upper plate 12 is a flat steel plate which has been bonded by known means to the under side of pad 10. Lower plate 14 is a self-lubricated plate of known construction and this is illustrated in more detail in FIG. 5. Here is shown a plurality of openings or apertures 22 and 24 located closely together, which apertures are filled with a solid lubricant 26. As the under surface of plate 12 is caused to slide on the upper surface of plate 14 as beam 2 expands and contracts, the lubricant 26 is carried between the engaging surfaces so that the plates will move easily with respect to each other over very long periods of use. In the preferred form, the plate 12 will be somewhat longer than plate 14 as indicated in FIG. 3 so that the ends of plate 12 throughout the extent of its movement will always be beyond the ends of plate 14. This insures maximum lubrication and protection of the lubricated surfaces.

Pad 16, on which lubricated plate 14 rests, is similar to upper pad 10. Plate 14 is bonded to pad 16 and the under side of pad 16 has been deformed by the pressure to interlock with the irregular upper surface 20 to pier 4.

The pads 10 and 16 may be made of a suitable plastic such as polyvinylchloride. The pads will be of sufficient area and strength to carry the load without squeezing out laterally to any appreciable extent. At the same time the pads, as already pointed out, have a degree of surface flexibility and compressibility that permits them to be deformed to be gripped by the configuration of the surfaces of the under side of the beam and the top of the pier. Since the pads are automatically locked against horizontal movement with respect to the surfaces they engage, it is unnecessary to otherwise secure the pads in position.

The pads may also be constructed so that they are of varying hardness from one surface to the other. Thus in pad 10 the upper surface would be of minimum hardness, with the hardness increasing downwardly to the surface adjacent the bonded upper plate 12. Likewise with pad 16 the bottom surface adjacent the pier would be made of minimum hardness, with the hardness increasing upwardly to the upper surface to which is bonded the lower lubricated plate 14.

With the construction just described assembled in the manner shown in FIG. 3, expansion or contraction of beam 2 (it being assumed that the other end of the beam is fixed with respect to its pier) will result in plate 12 moving slowly back and forth, as indicated by the double-ended arrow, sliding over the upper surface of self-lubricated plate 14. In this way, the performance of other mechanisms now in use for serving this purpose is fully matched.

Referring now to FIG. 7, it will be assumed that a heavy load has been applied to the center of beam 2. This causes the beam to deflect slightly and in actual practice the angular extent of the deflection, as already stated, will be in the order of 8 to 10 minutes. When this occurs, the pad 10 will be compressed at its right-hand end as indicated by the reduced dimension encompassed by the bracket numbered 28. This is possible because of the deformable characteristics of the pads. At the same time the righthand end of pad 16 will be compressed as indicated by the bracketed dimension 30. The extent of the angular compression of the righthand ends of pads 10 and 16 will equal the angle of deflection of the beam is indicated at 32. The upper and lower plates 12 and 14 being of much harder material than pads 10 and 16 are not compressed, but they are tilted to the right in the manner shown with the angle of the line of juncture between the two plates as indicated by the dot-dash line 34 being about one-half the angle of deflection of the beam. If change in length of beam 2 occurs while it is in the deflected condition shown by line 36 in FIG. 7, the plate 12 is free to slide with respect to plate 14 even though both plates have been turned slightly from the horizontal.

From the foregoing description it can be seen that I have provided a simple and inexpensive bearing support which does not need to be mechanically anchored to either the supporting pier or the under side of the concrete beam. Instead the device anchors itself when once in position and it permits longitudinal relative sliding of plates 12 and 14 with respect to each other and permits angular turning of the end of the beam without appreciably changing the per square inch loading of the beam on the pads or pier.

A modification of the invention is shown in FIG. 5. In this case the lower pad 16 and the attached lower lubricated plate 14 support directly the under side of the steel beam 38. This is possible when the under side of the beam 38, which is the surface 40, is sufficiently flat and smooth to take the place of the previously used upper plate 12. Thus sliding can occur between the surface 40 and plate 14 the same as between plates 12 and 14. If the beam 38 is deflected, all of the deflection is absorbed by pad 16 instead of being distributed between the two pads 10 and 16. This is possible, however, since the deflection, as heretofore pointed out, is a very small angle and by making the pad 16 of suitable material the extra compression can readily be absorbed as the beam bends.

A further modification is shown in FIG. 6 in which the upper plate 12 is introduced to cooperate with lower plate 14 which is bonded to and carried the pad 16. Pad 16 rests in interlocking relationship with the top of pier 4, but plate 12 will preferably be mechanically affixed as by welding at 39 to the under side of beam 38. This construction may be used when the under side of the beam is too rough and uneven to effect proper sliding relation with the upper surface of lubricated plate 14.

It is my intention to cover all changes and modifications of the examples of the invention herein chosen for purposes of the disclosure which do not constitute departures from the spirit and scope of the invention.

I claim:

Means for supporting the end of a beam, said means comprising a concrete pier with a roughened top surface, a somewhat compressible first pad resting on said surface, the under side of said pad under the load applied being interlocked with the said surface of the pier on which it rests, a self-lubricating plate having a flat upper surface on the upper side of said first pad and secured against horizontal movement with respect thereto, a second plate having a flat lower surface resting on said self-lubricating plate and slidable horizontally relative thereto, a second pad similar to said first pad on top of said second plate and secured thereto against horizontal relative movement, the end of said beam having a roughened flat under surface and resting on the upper side of said second pad, said second pad being made of somewhat compressible material and having its upper surface interlocked with the roughened under surface of the beam that rests on said second pad, said pads being compressible to distribute the load applied thereto as the end of the beam is rotated slightly in a vertical plane when the beam is deflected by a load.

References Cited in the file of this patent

UNITED STATES PATENTS

| | | |
|---|---|---|
| 1,732,648 | Flintermann | Oct. 22, 1929 |
| 1,810,378 | Ulrich | June 16, 1931 |
| 2,196,892 | Berndt | Apr. 9, 1940 |
| 2,267,403 | Herold | Dec. 23, 1941 |
| 2,655,005 | Kinneman | Oct. 13, 1953 |
| 2,680,259 | Milk | June 8, 1954 |
| 2,809,130 | Rappaport | Oct. 8, 1957 |
| 2,911,207 | Coble | Nov. 3, 1959 |
| 2,970,868 | Geyer | Feb. 7, 1961 |

FOREIGN PATENTS

| | | |
|---|---|---|
| 677,823 | Great Britain | Aug. 20, 1952 |
| 552,456 | Belgium | Nov. 30, 1956 |

OTHER REFERENCES

Types and Details of Bridge Construction, part 2, New York, 1906, McGraw Publishing Co., p. 180, F. W. Skinner.

Engineering News Record, April 27, 1939, p. 30.
Engineering News Record, May 14, 1959, pp. 42 and 44.
Product Engineering, July 20, 1959, p. 74.